Figure 1:
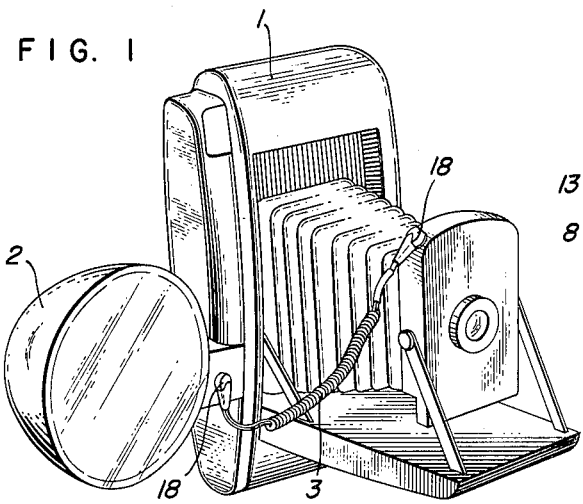

Feb. 22, 1966   F. P. ELLIOTT ETAL   3,237,147

ELECTRICAL APPARATUS

Filed Nov. 22, 1963

INVENTOR
FRANKLIN P. ELLIOTT
BY RONALD G. SCHMIDT

Arthur H. Swanson

ATTORNEY.

United States Patent Office 3,237,147
Patented Feb. 22, 1966

3,237,147
ELECTRICAL APPARATUS
Franklin P. Elliott and Ronald G. Schmidt, Denver, Colo., assignors to Honeywell Inc., a corporation of Delaware
Filed Nov. 22, 1963, Ser. No. 325,622
2 Claims. (Cl. 339—91)

The present invention is concerned with an improved electrical connector and particularly with an improved photographic shutter cord connector adapted to complete an electrical circuit between a normally open shutter switch on the camera and a photographic flash unit to be used with the camera.

While the problem of bending or strain relief is of importance in most types of electrical conductors, the problem has been a particularly perplexing one in the art of photographic shutter cords. These shutter cords of necessity must be small, light-weight cords, which must establish a reliable electrical connection without unduly restricting the operation of the camera and the photographic flash unit to be used with the camera. As is well known, a camera which is synchronized to be used with a flash unit is provided with a normally open shutter switch controlled in synchronism with the shutter of the camera. The closing of this switch, while the shutter is open, completes an electrical circuit by means of a shutter cord to a flash unit, which contains a source of illumination to be energized in synchronism with the opening of the camera shutter. The shutter cord is normally a separate piece of equipment which must be plugged into both the shutter switch outlet provided on the camera and the connector provided on the flash unit. Furthermore, when a flash unit is used the photographer may manually hold the flash unit at a number of positions with respect to the camera to provide different lighting effects. Such an operation requires that the shutter cord be capable of flexing and bending to any position.

It is an object of this invention to provide a connector between an end of a cord, such as a shutter cord, and a camera or flash unit having two mating parts which will be referred to as the male and female parts. These parts are held together by a plurality of spring biased detent means spaced axially along the surface of the parts and so arranged that at least one of said detent means of one of said parts engages a recess in the other of said parts to insure mechanical coupling, while another of said detent means, by virtue of said axial spacing, engages the surface of said other of said parts adjacent but spaced axially from the point of engagement between said one detent means and said recess and insures metallic continuity between said parts.

A further object of this invention is to provide a shutter cord having mating conducting parts which are capable of rotation about their axes.

Figure 3:
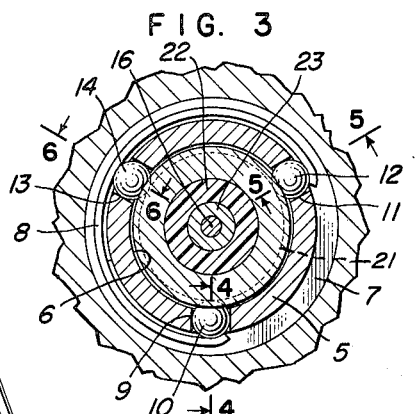
Figure 2:
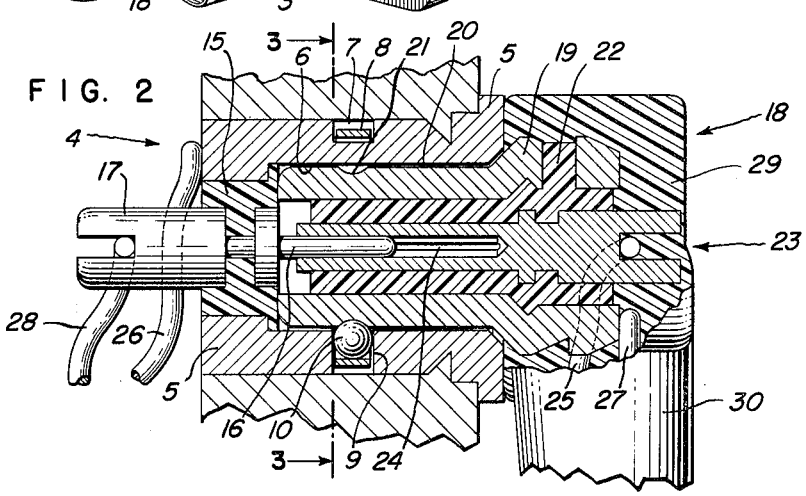
Figure 4:
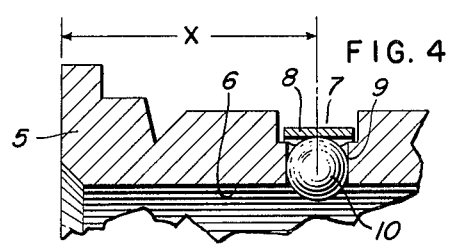
Figure 5:
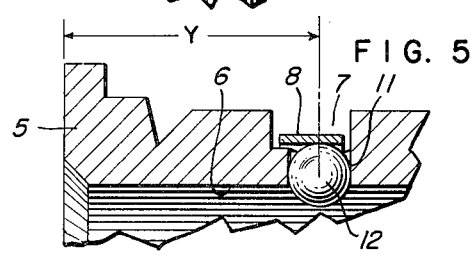
Figure 6:
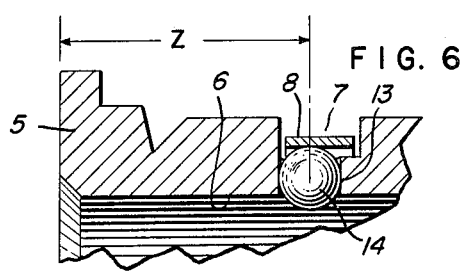

A better understanding of this invention may be had when the following detailed description is read in connection with the accompanying drawings, in which:

FIG. 1 is a perspective view;
FIG. 2 is a longitudinal, cross section showing the connecting parts of contact members;
FIG. 3 is a transverse, cross section on line 3—3 of FIG. 2 as viewed in the direction of the arrows; and
FIGS. 4, 5, and 6 are radial, cross sectional views on lines 4—4, 5—5, and 6—6, respectively, of FIG. 3 as viewed in the direction of the arrows.

FIG. 1 shows a camera 1 which is provided with a normally open shutter switch controlled in synchronism with the shutter of the camera. Attached to camera 1 is a flash unit 2 which contains a source of illumination adapted to be energized in synchronism with the opening of the camera shutter.

A shutter cord 3 connects the camera shutter switch to the flash unit 2. The outer metallic cord conductor 27 (FIG. 2) is the ground connection and the inner metallic cord conductor 25 is the above ground connection. Conductors 25 and 27 are covered by a layer 30 of resilient insulating material and form the cord 3.

At each end of the cord 3 means are provided for connecting the cord 3 to the shutter switch on camera 1 or to the flash unit 2. These means comprise a pair of connecting parts, one part being referred to as the female member and the other part being referred to as the male member.

The first outer contact member or female part is generally indicated 4 and comprises a metallic tube 5 having a cylindrical inner surface 6 and a groove 7 in its outer surface in which is contained a C-shaped spring 8. Between groove 7 and the inner surface 6 of tube 5 extend a plurality of radial holes 9, 11, and 13. Each of these holes is adapted to contain a ball 10, 12, and 14, respectively.

As is seen in FIGS. 4, 5, and 6, balls 10, 12, and 14 are each located in one plane perpendicular to the axis of the contact member 4 and parallel to each other and spaced along the axis of the contact member 4. FIG. 4 shows that ball 10 is located so that its diameter is aligned with the middle of the C-shaped spring 8. FIG. 5 shows that ball 12 is adjacent the right-hand end of spring 8. FIG. 6 shows that ball 14 is adjacent the left-hand end of spring 8. In other words, the distances X, Y, and Z of the balls 10, 12, and 14 from the left-hand end of the tube 5 are slightly different. The purpose of this will be explained hereinafter.

Adjacent the left end of tube 5 is a disc of insulation 15 in which is mounted the first inner contact member 16 which is a male contact member. Contact member 16 has a connection member 17 projecting therefrom to which is connected inner metallic cord conductor 28.

The second outer contact member generally indicated 18 is a male contact member and comprises a tube 19 of metal or other conductor having cylindrical outer surface 20 in which is an annular recess 21. Inside of contact member 18 is mounted a tube 22 of insulation in which is mounted the second inner contact member 23 which is a female contact and which has slits 24 extending longitudinally thereof.

One outer metallic cord conductor 27 is connected to the tube 19 of the second outer contact member. The second outer metallic cord conductor 26 is connected to the tube 5 of the first outer contact member 4. The first inner metallic cord conductor 25 is connected to the second inner contact member 23. The second inner conductor 28 is connected to the connection 17 of the first inner contact member 16.

The spring 8 presses balls 10, 12, and 14 into recess 21. Ball 10 is pressed into the bottom of recess 21 while ball 12 is pressed against the right-hand end of the recess while ball 14 is pressed against the left-hand end of the recess. This insures both good electrical connection and good mechanical connection between the male and female contact members 4 and 18.

The connection between conductor 27 and tube 19 and the connection between conductor 25 and member 23 are covered by a plug 29 of resilient insulating material.

What is claimed is:
1. An electrical connector including: a first metallic contact member having an opening formed as a cylindrical surface, a second metallic contact member having a cylindrical outer surface and adapted to loosely fit within the opening in said first contact member, and coupling means for said first and second contact members adapted to ensure both mechanical coupling and electrical continuity and comprising an annular recess formed on the surface of one of said contact members and a plurality of spring biased detent means spaced axially along the surface of the other of said contact members such that at least one of said detent means engages said recess to insure mechanical coupling while another of said detent means by virtue of said axial spacing engages the surface of said one contact member adjacent but spaced axially from the point of engagement between said one detent means and said recess and ensures electrical continuity between said contact members.

2. An electrical connector, including: a first outer contact member having a tube having a cylindrical inner surface and a groove in its outer surface and a plurality of holes passing radially through said tube and each located at a different distance from one end thereof, a C-shaped spring in said groove, a plurality of balls each located in one of said holes and biased by said spring towards the center of said tube, a disc of insulation located in a portion of the inner surface of said tube, a first inner contact member mounted in said disc of insulation and projecting therefrom in both directions axially of said tube, a second outer contact member having a tube having a cylindrical outer surface having an annular recess therein, said recess being adapted to receive portions of said balls in it, a tube of insulation located within the inner surface of said tube of said second outer contact member, a second inner contact member located in the center of said tube of insulation and projecting at each end therefrom, and metallic cord conductors each connected to a respective one of said contact members.

References Cited by the Examiner

UNITED STATES PATENTS

| | | | |
|---|---|---|---|
| 2,379,942 | 7/1945 | Webber | 339—177 X |
| 2,452,430 | 10/1948 | Clark et al. | 285—276 X |

JOSEPH D. SEERS, *Primary Examiner.*

ALBERT H. KAMPE, *Examiner.*